Nov. 10, 1964     E. O. SCHWEITZER     3,156,319
TRANSMISSION

Filed Nov. 17, 1961     2 Sheets-Sheet 1

INVENTOR
EARL O. SCHWEITZER
BY
ATTORNEY

Nov. 10, 1964  E. O. SCHWEITZER  3,156,319
TRANSMISSION
Filed Nov. 17, 1961  2 Sheets-Sheet 2

INVENTOR.
EARL O. SCHWEITZER
BY
*Elver J. Hyde*
ATTORNEY

United States Patent Office 3,156,319
Patented Nov. 10, 1964

3,156,319
TRANSMISSION
Earl O. Schweitzer, Wickliffe, Ohio, assignor to Clevite Corporation, a corporation of Ohio
Filed Nov. 17, 1961, Ser. No. 153,177
1 Claim. (Cl. 184—6)

This invention pertains to a gear mechanism and more particularly to a transmission such as a speed reducer for instrument drives and the like.

The device of this invention is particularly adapted to drive chart paper for pen recorders or the like but is not limited thereto.

Pen recorders are utilized for recording various phenomena and sometimes it is desirable to have the chart paper move at a very slow speed and at other times it is desirable to have the chart paper move at a very high speed. For most economical use of the chart paper it is essential to have a relatively wide variety of chart speeds between the slowest and fastest, otherwise the expensive chart paper is wasted.

It is an object of the present invention to provide a gear mechanism which is versatile in that in a relatively small space a wide variety of output speeds may be obtained.

Another object of the present invention is to provide a gear speed reducer mechanism for driving chart paper or the like, wherein the device is comprised of a plurality of gear stages, and wherein a number of the gear stages may be added to the device to provide for more speed reduction and to provide a device wherein combinations of the individual gear stages can be selected to provide a mechanism having a very wide selection of speed ratios.

Still another object of the present invention is to provide a gear mechanism wherein the speed of the input shaft may be quickly and easily stepped down through one or a plurality of gear stages so that the operator may select any one of a wide variety of output shaft speeds.

Another object of the present invention is to provide a gear mechanism which is essentially self-lubricating.

Still another object of the present invention is to provide a variable speed drive device wherein any number of modular gear stages may be assembled into the device to provide a mechanism having a wide range of speed variation characteristics.

Another object of the invention is to provide a gear mechanism in an essentially sealed housing, wherein oil therein continually circulates and is filtered.

Still another object of the invention is to provide a gear mechanism wherein structural members which support the gears are made of oil permeable material forming part of an oil circulation system.

For a better understanding of the present invention, together with other and further objects thereof, reference is had to the following description taken in connection with the accompanying drawings, and its scope will be pointed out in the appended claim.

Figure 1:
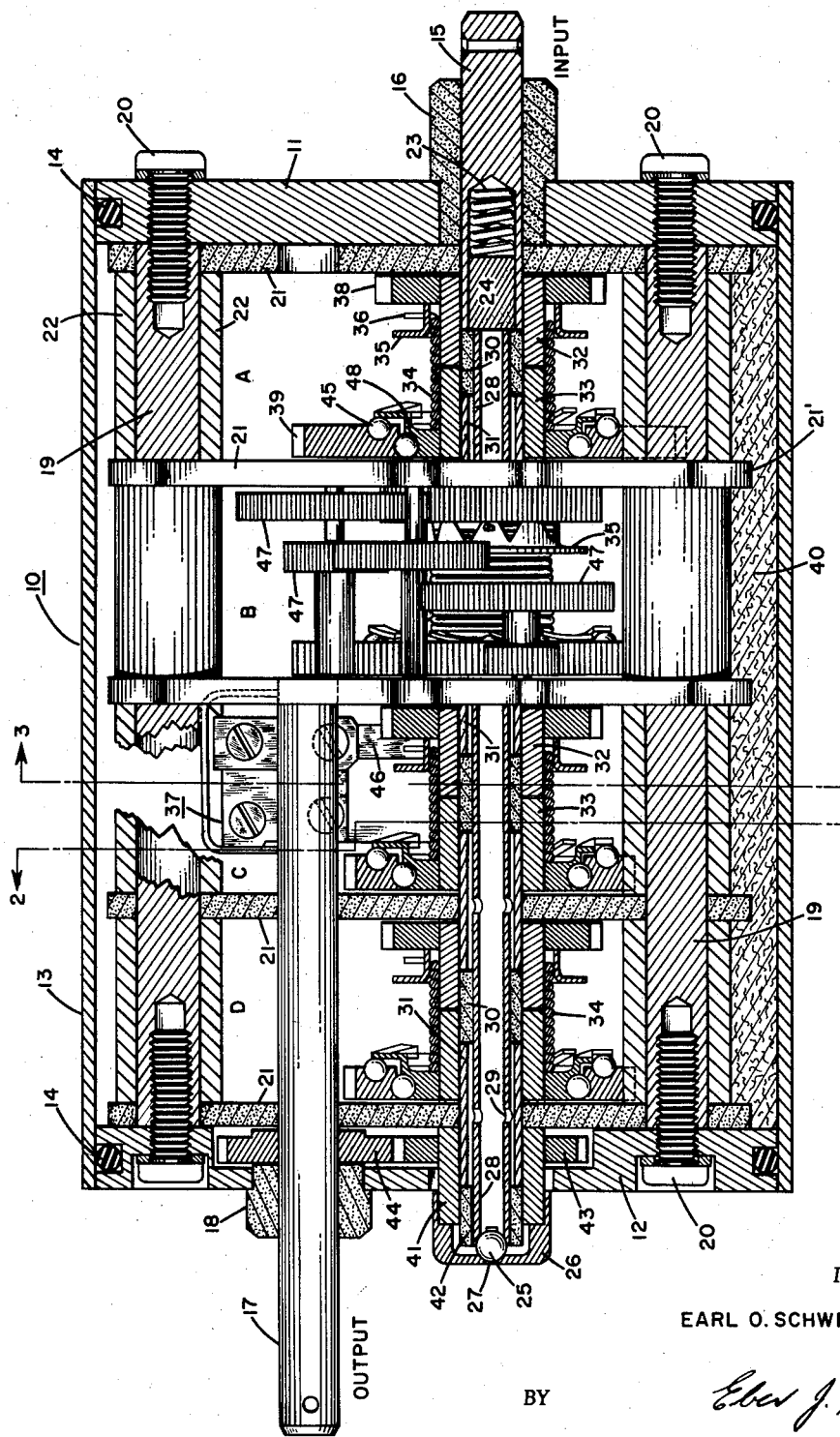
FIGURE 1 is a longitudinal cross-sectional view of a gear mechanism, embodying the invention, and having four gear stages; three of the four gear stages are shown in sectional views with the gears removed and the fourth is shown in side view.

An aspect of the invention lies in the provision of a gear mechanism having one or more structural wall members formed of oil permeable material. Gear means are journaled in the structural wall and a housing encloses the wall and the gear means and defines an oil sump. The permeable structural wall member extends into engagement with oil which is in the oil sump, whereby oil is transmitted through the permeable structural wall to the gear means which are journaled therein thereby to lubricate the gear journal and the gears.

Another aspect of the invention lies in the provision of a variable speed transmission device wherein there is an enclosed housing having first and second end wall means. A hollow oil shaft extends through one of the end walls and has an opening into the housing for periodic replacement of the oil supply, and the hollow oil shaft has a plurality of openings located within the housing through which oil escapes to lubricate parts within the housing. Oil permeable sleeve bushings are mounted around the oil shaft to control the rate at which the oil escapes from the hollow shaft. The device includes an input shaft and an output shaft with intermediate meshing gear means for coupling the two shafts together. Coupling sleeves are mounted around and in engagement with the oil permeable sleeves so that they are lubricated by the escaping oil, and spring clutch means are mounted around the coupling sleeves and are controlled by control means so that the operator can selectively control whether the drive is from one of the sleeves to the other directly through the spring clutch means or whether the drive is indirect through the intermediate gears.

With reference to the drawings the device of the present invention comprises a sealed housing 10 formed of two end plates 11 and 12 and an intermediate enclosing wall section 13 which extends completely around the periphery of the end plates 11 and 12. O-rings 14 are mounted in grooves in the end plates 11 and 12 and form a seal with the wall section 13, thus the two end plates 11 and 12 and the enclosing wall section 13 together form a complete enclosed housing. An input shaft 15 extends through an "Oilite" bushing 16 into the interior of the housing 10. An output shaft 17 extends through the other wall 12 of the housing and an "Oilite" bushing 18 is mounted in the wall 12 to accommodate the output shaft 17.

Four gear stages A, B, C, and D are shown located between the input shaft 15 and the output shaft 17. For sake of clarity, in the drawings stage A does not show the gears mounted to mesh with the input shaft 15. Stage B shows a complete gear reducing mechanism, stage C particularly shows the relay mechanism for energizing a gear stage to throw it into the speed reducing chain, and stage D, similar to stage A, has the reducing gears removed to particularly show the structure of the input shaft device. It is to be understood, however, that reducing gears may be provided in all four gear stages in order to obtain flexibility in a wide selection of gear ratios.

In practice, for example, gear stage A may provide, by itself, a 100 to 1 speed reduction from the input shaft to the output shaft. Stage B, by itself, may provide a 10 to 1 reduction, stage C may provide, by itself, a 4 to 1 reduction, and stage D may provide, by itself, a 2 to 1 reduction. By selecting direct through drive, or by selecting combinations of the various reductions through the stages, the following output shaft speed ratios, compared to the input shaft speed, may be obtained: 1 to 1, 1 to 2, 1 to 4, 1 to 8, 1 to 10, 1 to 20, 1 to 40, 1 to 80, 1 to 100, 1 to 200, 1 to 400, 1 to 800, 1 to 1000, 1 to 2000, 1 to 4000, and 1 to 8000. Other gear stages can easily be added during manufacture, each one greatly increasing the range and flexibility of the device. It will be seen that with only four different gear stages a very wide range of speed reduction can be obtained.

The housing 10 is held together by three pins 19 which extend from the end wall 11 to the end wall 12 and which are held together by means of bolts 20 which extend through the end walls 11, 12 into threaded engagement with the pins 19. The wall section 13 is wrapped around the end walls and its ends are bolted or otherwise clamped together by means 9, not shown. As shown in the drawing, the pins 19 are of sufficient length to accommodate four gear stages, A, B, C, and D. If more gear stages than A, B, C, D are desired, longer pins will be used, and if fewer gear stages are desired shorter pins 19 will be used. Thus, in the housing and its connections, only the pins 19 and the wall section 13 must be of special size depending upon the number of gear stages used. The end walls 11 and 12 and the three spaced apart mounting pins 19 and the bolts 20 form a rigid frame. Internal structural wall members 21 formed of oil permeable material such as "Oilite" are mounted on the three pins 19. Where four gear stages are used it is desirable to have five of these oil permeable structural wall members, as shown, and it is desirable from a manufacturing standpoint to have these wall members identical with each other. The pins 19 extend through holes in the structural wall members 21 and spacers 22 are mounted around the pins 19 between the wall members 21 thereby establishing a rigid framework and support for the entire device and for the gears which are mounted on the oil permeable structural wall members 21.

Figure 2:
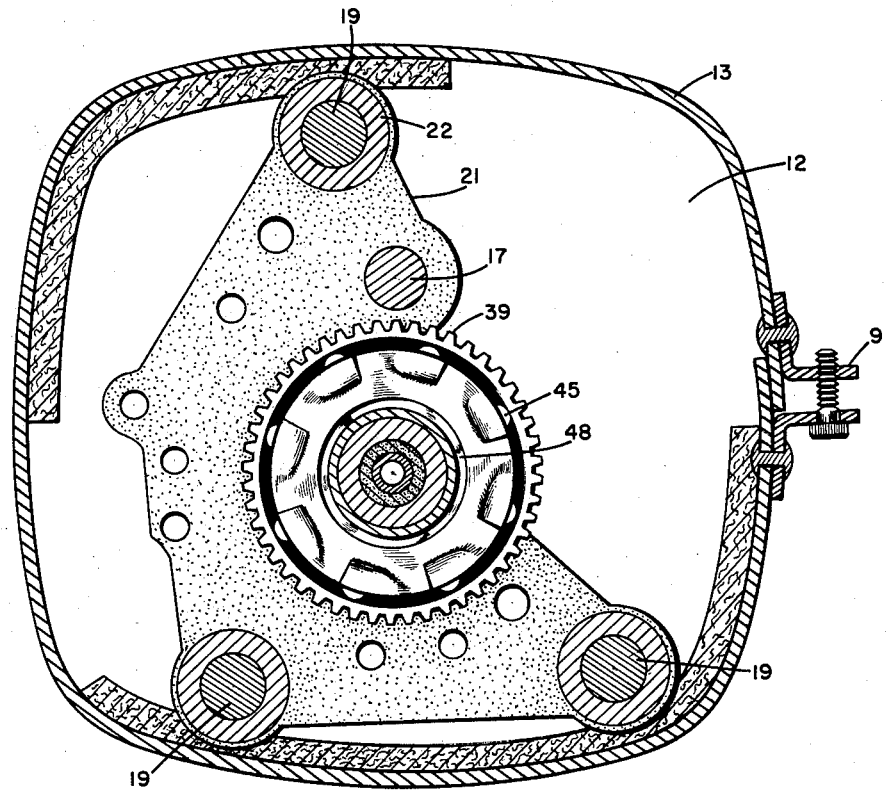
FIGURE 2 is a sectional view taken along line 2—2 of FIGURE 1, particularly showing the ball clutch and the structural wall which is made of oil permeable material.
Figure 3:
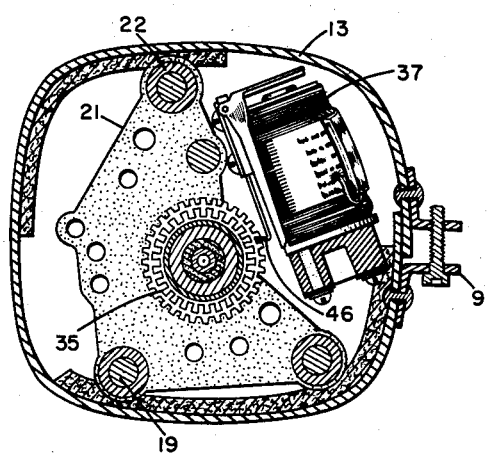
FIGURE 3 is a sectional view taken along line 3—3 of FIGURE 1.

The input shaft 15 extends through the wall member 11 and extends through the first structural member 21 terminating in stage A in the interior of the housing 10. Preferably it is hollow and a spring 23 is mounted within the input shaft 15 and oil retaining nylon felt material 24 fills the hollow portion in the shaft 15. The input shaft 15 and the input shaft mechanism driven thereby extend through all of the structural wall members 21 and through the end plate 12 terminating outside of the wall 12 of the housing. A ball 25 is mounted in the end of the input shaft mechanism 15 and an end cap 26 holds the ball in place and is mounted on mechanism which will be described. A hole 27 extends through the end cap 26 at the location of the ball 25 through which oil is furnished to the housing. Through hollow oil shaft 28 which extends through all of the gear stages A, B, C, D, the spring 23 biases the ball 25 against the end cap 26, normally closing the hole 27 therein. When oil is to be added to the device the operator pushes ball 25 compressing the spring 23, oil may then be added to the hollow input shaft 15 and thereafter the spring 23 seals the opening 27. The material 24 within the input shaft 15 abuts against the hollow oil shaft 28 and the shaft 28 at its other end receives the ball 25. Spaced apart holes 29 are provided in the shaft 28 so that oil may flow from the interior of the hollow shaft 28 to the outside thereof. In each of the gear stages A, B, C and D an "Oilite" sleeve 30 is mounted around the hollow oil shaft 28 intermediate the oil holes 29. As shown in gear stage A, the "Oilite" sleeve 30 abuts against the input shaft 15. A hardened steel bushing sleeve 31 is mounted around and in spaced relation to the hollow oil shaft 28 and terminates close to but spaced from the "Oilite" sleeve 30. Each oil hole 29 in the shaft 28 is located diametrically inwardly from the bushing sleeve 31 so that oil may flow from the interior of the hollow oil shaft 28 through holes 29 into the spaces between the hollow oil shaft 28 and the bushing sleeves 31. Thus, oil touches the abutting "Oilite" sleeve 30 and since the "Oilite" sleeve 30 is permeable to oil, over a period of time the oil from the oil shaft 28 will slowly seep out through the "Oilite" sleeve 30. The bushing sleeves 31 are mounted in holes in the structural wall members 21 and each is thereby firmly but rotatably held in place radially by the "Oilite" structural wall members. All control of axial play is built into the bearing plate 21 sub-assembly shown in side view in FIGURES 2 and 3. Each of the sub-assemblies has a fixed small amount of clearance between the sleeves and the plate so that when several gear stages are aligned end-to-end each stage retains its individual amount of end play and bolting the stages together does not result in tightening up of the unit. A first coupling sleeve 32 in gear stage A is mounted around the inner end of the input shaft 15 and is coupled thereto for rotation by means of a force fit, thus becoming part of the input shaft mechanism. The inward end of the coupling sleeve 32 extends over the "Oilite" sleeve 30 and will rotate in respect to the sleeve 30. Oil which seeps through sleeve 30 lubricates this sliding joint. A second coupling sleeve 33 is mounted on the bushing sleeve 31 and the two coupling sleeves 32, 33 are spaced apart from each other by a small amount. A coupling spring 34, forming a one-way clutch, is mounted around and in engagement with both coupling sleeves 32, 33. The input shaft 15 rotates and in doing so causes the coupling sleeve 32 to rotate. When the solenoid is not energized and collar 35 is free to rotate the coupling spring 34 winds up as sleeve 32 rotates and tightly couples the input coupling sleeve 32 to the output coupling sleeve 33, forcing the output sleeve 33 to rotate in unison with the input sleeve 32. When the solenoid is energized an arm 46 engages the toothed collar 35, preventing it from rotating and thus preventing the coupling spring 34 from rotating. This, in effect, unwinds the spring slightly so that it cannot couple together the two coupling sleeves 32, 33, and causes the drive to be through the gears 47. When the drive is direct through coupling spring 34 a ball clutch 45 permits clutch collar 48 to rotate without rotating gear 39. However, when the transmission is through the gears 47, and is not through spring 34, the gear 39 is driven and ball clutch 45 couples it to clucth collar 48 causing it to rotate, thus rotating the output coupling sleeve 33 to which it is secured.

When the coupling spring 34 is used for direct drive, the coupling sleeve 33 rotates in unison with the coupling sleeve 32 and thus rotates the bushing sleeve 31, which in turn rotates the coupling sleeve 32 in the next gear stage B. Thus the coupling sleeve 33 and the bushing sleeve 31, while being part of the input shaft mechanism, comprise the output from gear stage A and comprise the input to gear stage B. When the coupling spring 34 is disconnected from coupling sleeve 33 by energization of a solenoid (not shown in stage A), the drive will be from the input shaft 15 through the coupling sleeve 32 to the gear 38 and thence through a gear train (similar to that shown in stage B) to an output gear 39, and from the output gear 39 to the coupling sleeve 33 and thus through bushing sleeve 31 to the input to the next gear stage B.

It will be appreciated from this that the operator, by not energizing the solenoid mechanism which is in stage A, may route the drive from input shaft 15 directly through gear stage A by means of coupling sleeves 32, 33 and spring clutch 34, to gear stage B without a change in the rate of rotation of the shaft mechanism, or he may, by energizing the solenoid, route the drive through suitable gears in stage A to cause the output shaft 33 of stage A and the input shaft of stage B to rotate at a reduced rate of speed.

All of the gear stages A, B, C and D are essentially the same, the only difference being in the gears which transmit motion from the input coupling sleeve 32 of each section to the output coupling sleeve 33.

As will be particularly seen in gear stage B, the reducing gears are journaled in the structural wall members 21. These structural wall members are made of "Oilite" material and their lowermost edges 21' extend almost to the bottom of the housing 10. Oil gathers in the bottom of the housing and is filtered through felt material 40 which is soaked with oil and which extends into engagement with the lowermost edges 21' of the structural wall members 21. Since these structural wall members are made of oil permeable material, an oil circulation system is set up. Oil in the bottom of the housing 10 is filtered through the felt material 40 and substantially clean oil is at all times in engagement with the lowermost edges 21' of the structural wall members 21. This clean oil flows through the structural members to the journals of the gears and from the journals the oil flows to the gears themselves. As the gears rotate excess oil is thrown off, striking the wall section 13 and running down the wall sections to the felt material 40 where it is filtered. Thus it will be seen that there is a gradual circulation of the oil and a continual cleaning by filtering action both in the felt and in the oil permeable wall material.

The input rotation of input shaft 15 is changed by the gears in stages A, B, C and D in accordance with the wishes of the operator, by the operator energizing one or more of the control solenoids, and the final output from stage D is from the output bushing sleeve 31 to the output sleeve 41 mounted around and in frictional engagement with the bushing sleeve 31 and mounted around "Oilite" sleeve 42. Output sleeve 41 is tightly frictionally coupled to output gear 43 which is in driving engagement with output gear 44. Gear 44 is coupled to output shaft 17. Oil from permeable wall 21 adjacent gears 43, 44 keeps them well lubricated.

While a four-stage gear mechanism has been shown, it will be obvious from the foregoing description that the modular structure of the device permits adding any number of other gear stages if further speed reduction or flexibility is required. If a larger gear mechanism is desired only a very few special parts are needed; namely, longer mounting pins 19 are required and a longer hollow oil shaft 28 is required. All other parts are the same from gear stage to gear stage. This reduces the cost of the device since only a very few special parts must be kept in stock to provide for a wide range of speed reducing devices.

Output gears 43, 44 are similar so that under one chosen condition the output shaft 17 will turn at exactly the same speed as the input shaft 15. This condition occurs when all gear stages are by-passed and the drive is from the input shaft 15 to sleeve 32 to spring clutch 34 to sleeve 33 through all of the stages. However, it is within the scope of the invention to change the gear ratio between the output gears 43, 44; for example, if 50 cycle per second current is available to energize a motor which drives the transmission and an output speed is desired from the transmission to make it look as though it were driven by a motor energized by 60 cycle per second current, the ratio between the final output gears 43, 44 is changed to produce an output speed 6/5 times the speed from the last gear stage.

While there have been described what are at present considered to be the preferred embodiments of this invention, it will be obvious to those skilled in the art that various changes and modifications may be made therein without departing from the invention, and it is, therefore, aimed in the appended claim to cover all such changes and modifications as fall within the true spirit and scope of the invention.

I claim:

Lubricating means for a transmission having gears and clutches within a closed housing comprising, hollow oil shaft means extending through said housing and having an opening external of said housing for periodic replenishment of the oil supply and having a plurality of openings located within said housing through which oil escapes, hollow drive shaft means extending through said housing and coaxially around and spaced from said oil shaft into which said oil escapes, said drive shaft means comprising a plurality of coaxially aligned relatively rotatable sections forming joints between each two sections thereof and on which said gears and clutches are mounted, a plurality of oil permeable sleeve bushing means mounted around said oil shaft means and within said hollow drive shaft means for mounting said drive shaft means in spaced relation around said oil shaft means, one of said sleeve bushing means being located at each of said joints in the drive shaft means to control the rate at which oil escapes from said hollow drive shaft means through said joints to the sad gears and clutches which are mounted on said drive shaft means.

References Cited in the file of this patent

UNITED STATES PATENTS

| | | |
|---|---|---|
| 2,167,846 | Martain | Aug. 1, 1939 |
| 2,610,096 | Mallory | Sept. 9, 1952 |
| 2,819,624 | Brown et al. | Jan. 14, 1958 |
| 3,073,176 | Daugirdas | Jan. 15, 1963 |